(12) United States Patent
Hamahira et al.

(10) Patent No.: US 6,191,198 B1
(45) Date of Patent: Feb. 20, 2001

(54) MICRO-POWDERY STAIN COMPOSITION FOR UNSATURATED POLYESTER RESIN, UNSATURATED POLYESTER RESIN COMPOSITION AND PRODUCTION PROCESS THEREFOR

(75) Inventors: Eizo Hamahira; Takasi Nakayama, both of Itami (JP)

(73) Assignee: Sumika Color Company, Limited, Osaka (JP)

(*) Notice: Under 35 U.S.C. 154(b), the term of this patent shall be extended for 0 days.

(21) Appl. No.: 09/223,852

(22) Filed: Dec. 31, 1998

(51) Int. Cl.$^7$ .................................................. C08K 5/00

(52) U.S. Cl. ............................ 524/80; 528/176; 528/196

(58) Field of Search .................................. 528/176, 196; 524/80

(56) References Cited

PUBLICATIONS

Encyclopedia of Polymer Science and Engineering, vol. 12, pp. 690–698 (1988).*

\* cited by examiner

Primary Examiner—Terressa M. Boykin

(57) ABSTRACT

The present invention provides: a stain composition for an unsaturated polyester resin, and an unsaturated polyester resin composition, both of which have excellent conservation stability without problems of the gelation, the viscosity increase, the sinking, the color separation, and so on; and further a production process for the unsaturated polyester resin composition. The micro-powdery stain composition for an unsaturated polyester resin comprises either or both of a pigment and an oil-soluble dye as well as a resin, and is characterized in that the resin as included in the composition is at least one resin selected from the group consisting of polystyrene, low molecular polystyrene, low molecular acrylstyrene and low molecular acryl.

19 Claims, No Drawings

MICRO-POWDERY STAIN COMPOSITION FOR UNSATURATED POLYESTER RESIN, UNSATURATED POLYESTER RESIN COMPOSITION AND PRODUCTION PROCESS THEREFOR

BACKGROUND OF THE INVENTION

A. Technical Field

The present invention relates to: a micro-powdery stain composition for an unsaturated polyester resin; an unsaturated polyester resin composition; and a production process for the unsaturated polyester resin composition.

B. Background Art

Generally, molding processes of FRP are, for example, as follows: a process comprising the step of press-molding a molding material such as SMC (Sheet Molding Compound) or BMC (Bulk Molding Compound) as obtained by molding an unsaturated polyester resin composition into a sheet or bulky shape respectively, wherein the unsaturated polyester resin composition is prepared by combining an unsaturated polyester resin with a low-shrinkage agent, a filler, a stain, a glass fiber and so on; and a hand-lay-up-molding process comprising the step of coating a stain resin, which is called gel coat, to a mold by spray- or hair-coating, and then reinforcing the coated matter with a glass fiber or unsaturated polyester resin. The stain, used in these molding processes, is a pasty stain which is obtained by kneading an unsaturated polyester resin, a plasticizer, and either or both of a pigment and an oil-soluble dye using a three-roll mill, a bead mill, or the like.

The unsaturated polyester resin is usually a solution in which a liquid polymerizable monomer such as a styrene monomer is used as the solvent, so there is a merit in that the pasty stain is easy to disperse because liquids easily disperse into each other, but there are various problems in that the gelation or the increase of the viscosity occurs when conserving the stain, and the usage therefore becomes impossible, and in that color differences or color separations occur due to sinking of substances of heavy specific gravity such as titanium oxide.

SUMMARY OF THE INVENTION

A. Object of the Invention

It is an object of the present invention to provide: a stain composition for an unsaturated polyester resin, and an unsaturated polyester resin composition, both of which have excellent conservation stability without the above problems that might occur when conserving the stain; and further a production process for the unsaturated polyester resin composition.

B. Disclosure of the Invention

The present inventors studied with encouragement to themselves and great efforts to solve the above problems. As a result, they found that if a micro-powdery composition, comprising either or both of a pigment and an oil-soluble dye as well as at least one resin selected from the group consisting of polystyrene, low molecular polystyrene, low molecular acrylstyrene and low molecular acryl, is used as the stain composition, a stain composition for an unsaturated polyester resin is obtained, which composition for an unsaturated polyester resin has excellent conservation stability without the above demerits on the pasty stain, that is to say, the gelation, the viscosity increase, the sinking, the color separation, and so on. Also, the inventors found that for obtaining the dispersibility of the above stain composition into the unsaturated polyester resin at not lower than the same level as of the pasty stain, it is desirable to adjust the particle diameter of the above stain composition to fall in the specific range. Thus, the inventors achieved the present invention.

That is to say, the present invention has the below constitution.

(1) A micro-powdery stain composition for an unsaturated polyester resin, comprising either or both of a pigment and an oil-soluble dye as well as a resin, characterized in that the resin as included in the composition is at least one resin selected from the group consisting of polystyrene, low molecular polystyrene, low molecular acrylstyrene and low molecular acryl.

(2) A micro-powdery stain composition for an unsaturated polyester resin as described in (1) above, which has an average particle diameter of 900 micron or less.

(3) An unsaturated polyester resin composition, comprising an unsaturated polyester resin and either or both of a pigment and an oil- soluble dye, with the composition being characterized by further comprising at least one resin selected from the group consisting of low molecular polystyrene, low molecular acrylstyrene and low molecular acryl.

(4) A production process of an unsaturated polyester resin composition including an unsaturated polyester resin and either or both of a pigment and an oil-soluble dye, with the process being characterized by comprising the step of mixing the unsaturated polyester resin with a micro-powdery stain composition which includes either or both of a pigment and an oil-soluble dye as well as at least one resin selected from the group consisting of polystyrene, low molecular polystyrene, low molecular acrylstyrene and low molecular acryl.

These and other objects and the advantages of the present invention will be more fully apparent from the following detailed disclosure.

DETAILED DESCRIPTION OF THE INVENTION

Either or both of the pigment and the oil-soluble dye, used in the present invention, are not limited providing that they do not involve the discoloration or the deterioration of the physical properties of the resin when coloring the unsaturated polyester resin. Examples of the pigment include: organic pigments of the types such as monoazo, disazo, polyazo, phthalocyanine, quinacridone, perylene, perinone, and their heterocyclic ones; and inorganic pigments, such as carbon black, titanium oxide, titanium yellow, cobalt green, cobalt blue, ultramarine, red iron oxide, barium sulfate and sintered pigments. Examples of the oil-soluble dye include the types such as monoazo, disazo, anthraquinone, perylene, perinone, and their heterocyclic ones.

The respective molecular weights of the low molecular polystyrene, the low molecular acrylstyrene and the low molecular acryl, used in the present invention, are preferably in the range of 1,000~10,000 and more preferably in the range of 1,500~5,000 in terms of number-average molecular weight. Because these resins have low molecular weight, these resin have excellent solubility in the unsaturated polyester resin composition, and further, it is not necessary to use a special device as a processing machine.

The molecular weight of the polystyrene, used in the present invention, is usually in the range of 60,000~200,000 and preferably in the range of 80,000~100,000 in terms of number-average molecular weight. Thus, the molecular weight of the polystyrene is distinguished from that of the low molecular polystyrene. When using the polystyrene, it is preferable to use together a plasticizer to improve the processability and the solubility. Examples of such a plasticizer include dioctyl phthalate, dibutyl phthalate and diallyl phthalate.

The polystyrene, the acrylstyrene and the acryl have merits in that they have solubility to a styrene monomer which is used to dissolve the unsaturated polyester resin and in that they further serve as a low-shrinkage agent in the SMC usage and so on.

The mixing ratio of either or both of the pigment and the oil-soluble dye to the at least one resin selected from the group consisting of polystyrene, low molecular polystyrene, low molecular acrylstyrene and low molecular acryl is not especially limited. A production process, for example, can be used, which process comprises the following sequential steps of: mixing all components beforehand; kneading the resultant mixture in a heat-melted state with a kneading machine such as a three-roll mill, a kneader, a Banbury mixer or a twin-screw extruder; cooling the mixture to normal temperature; and pulverizing the mixture with a conventional pulverizing machine, for example, a hammer mill as equipped with a screen of the diameter of 1 mm.

A preferable mixing ratio in the micro-powdery stain composition of the present invention is such that the at least one resin selected from the group consisting of polystyrene, low molecular polystyrene, low molecular acrylstyrene and low molecular acryl is in the range of 80~500 weight parts per 100 weight parts of either or both of the pigment and the oil-soluble dye. In the case where it is less than 80 weight parts, it is difficult to process materials with a dispersion machine such as a three-roll mill. In the case where it exceeds 500 weight parts, the amount of the pigment becomes small, and it is therefore necessary to increase the number of parts of the pigment as added to the unsaturated polyester resin, so economical problems occur.

If necessary, the following materials, for example, may be added to the micro-powdery stain composition of the present invention in the range which does not damage the effects of the present invention: fillers such as calcium carbonate, clay and talc; plasticizers; antioxidants; and ultraviolet ray absorbing agents.

The average particle diameter of the micro-powdery stain composition of the present invention is, considering the solubility, preferably 900 micron or less, and more preferably 400 micron or less. When the average particle diameter is great, much time is necessary for obtaining the dispersibility at not lower than the same level as of the pasty stain, so this is not industrial.

Because the micro-powdery stain composition of the present invention is soluble to liquid polymerizable monomers such as a styrene monomer which are used to dissolve the unsaturated polyester resin, it can be used as a stain for unsaturated polyester resin moldings such as SMC, BMC and gel coat (desirably, SMC and BMC). Also, in the micro-powdery stain composition of the present invention, a fundamental color of which the pigment composition is single can be combined, and further, an ordered color as matched with a color appointed by a molding maker is also available.

A method for producing the unsaturated polyester resin composition by using the present invention micro-powdery stain composition, for example, comprises the step of mixing the above micro-powdery stain composition with the unsaturated polyester resin (which is usually in a state dissolved in the liquid polymerizable monomer). The resultant unsaturated polyester resin composition includes either or both of the pigment and the oil-soluble dye as well as the at least one resin selected from the group consisting of polystyrene, low molecular polystyrene, low molecular acrylstyrene and low molecular acryl, wherein these components are derived from the above micro-powdery stain composition.

As to the unsaturated polyester resin, conventional ones are available. The unsaturated polyester resin is obtained by a condensation reaction of a polybasic acid component, including an unsaturated polybasic acid and, if necessary, a saturated polybasic acid, with a polyhydric alcohol. Examples of the unsaturated polybasic acid include fumaric acid, maleic acid, maleic anhydride, itaconic acid, citraconic acid, mesaconic acid, chloromaleic acid and their dialkyl esters. Examples of the saturated polybasic acid include phthalic acid, phthalic anhydride, isophthalic acid, terephthalic acid, HET acid (hexachloro-endo-methylenetetrahydrophthalic acid), hexahydrophthalic anhydride, adipic acid, sebasic acid and azelaic acid. Examples of the polyhydric alcohol include: diols, such as ethylene glycol, diethylene glycol, propylene glycol, dipropylene glycol, trimethylene glycol, 1,2-butanediol, 1,3-butanediol, 1,4-butanediol, 1,2-pentanediol, 1,6-hexanediol, cyclohexanediol, neopentyl glycol, 2,2,4-trimethyl-1,3-pentanediol, glycerol monoallyl ether, hydrogenated bisphenol A, 2,2-b is(4-hydroxyethoxyphenyl )propane, and 2,2-b is(4-hydroxypropoxyphenyl)propane; triols, such as trimethylolpropane; and tetraols, such as pentaerythritol.

The unsaturated polyester resin is usually used in a state dissolved in the liquid polymerizable monomer. Example of such a liquid polymerizable monomer include (meth)acrylic esters, aromatic vinyl compounds, and allyl alcohol esters of aromatic carboxylic acids. These liquid polymerizable monomers causes a crosslinking reaction with the unsaturated polyester resin when mold-processing. Among these liquid polymerizable monomers, particularly, styrene can favorably be used.

The unsaturated polyester resin composition of the present invention, if necessary, may further comprise various additives in the range which does not damage the effects of the present invention. The additives are, for example, as follows: low-shrinkage agents (e.g. thermoplastic resins); fillers such as calcium carbonate, clay and talc; thickeners; curing agents; reinforcing agents such as glass fibers and carbon fibers; antioxidants; and ultraviolet ray absorbing agents.

The ratio of the micro-powdery stain composition in the unsaturated polyester resin composition is preferably in the range of 25 weight parts or below, and more preferably in the range of 1.0~12.0 weight parts, per 100 weight parts of the unsaturated polyester resin. In the case where the ratio of the micro-powdery stain composition is great, too large an amount of low molecular resin component as included in the micro-powdery stain composition is incorporated into the unsaturated polyester resin composition, so the gloss of the surface is apt to be bad when press-molding the SMC and so on. In this case, such a problem is adjustable by decreasing the low-shrinkage agent as included in the unsaturated polyester resin composition, but in the case where the ratio of the micro-powdery stain composition exceeds 25 weight parts, the molding provides inferior results. Or otherwise, in the case where the ratio of the micro-powdery stain composition is less than 1.0 weight part, the composition does not serve as the stain, and the glass fiber and so on comes up to the surface, so the appearance becomes bad.

To produce, for example, the SMC from the unsaturated polyester resin composition of the present invention, the following process is available: the unsaturated polyester resin composition is spread on a film and impregnated to the glass fiber, and then covered with a film and moderately compressed for sufficient impregnation, and thickened into the shape of a sheet. Also, to produce the BMC, the following process is available: the unsaturated polyester resin composition is kneaded with the glass fiber and thickened into a bulky shape.

(Effects and Advantages of the Invention):

The present invention stain composition for an unsaturated polyester resin has excellent conservation stability without problems of the gelation, the viscosity increase, the sinking, the color separation, and so on during the conservation. Accordingly, an unsaturated polyester resin composition can stably be produced using this stain composition.

DETAILED DESCRIPTION OF THE PREFERRED EMBODIMENTS (The following paragraph is only an example of the introduction into this portion. Therefore, modification is available, if necessary.)

Hereinafter, the present invention is more specifically illustrated by the following examples of some preferred embodiments in comparison with comparative examples not according to the invention. However, the invention is not limited to the below-mentioned examples.

In addition, in the examples, unless otherwise noted, the unit "part(s)" denotes "weight part(s)".

EXAMPLES 1~7
(preparation of micro-powdery stain compositions 1~7)

As for Examples 1~4, 6 and 7, the components were mixed in the mixing ratio of Table 1, and then kneaded in a heat-melted state with a three-roll mill, and then cooled to normal temperature, and then pulverized with a hammer mill as equipped with a screen of the diameter of 1 mm, thus obtaining micro-powdery stain compositions for an unsaturated polyester resin 1 (white), 2 (black), 3 (red), 4 (yellow), 6 (toned-color type) and 7 (toned-color type).

As for Example 5, the components were mixed in the mixing ratio of Table 1, and then kneaded in a heat-melted state with a kneader, and then cooled to normal temperature, and then pulverized with a hammer mill as equipped with a screen of the diameter of 1 mm, thus obtaining a micro-powdery stain composition 5 (blue).

COMPARATIVE EXAMPLES 1~2
(preparation of pasty stain compositions 8~9)

The components were mixed in the mixing ratio of Table 1, and then kneaded and dispersed with a three-roll mill, thus obtaining pasty stain compositions for an unsaturated polyester resin 8 (yellow) and 9 (toned-color type).

COMPARATIVE EXAMPLE 3
(preparation of micro-powdery stain composition 10)

The components were mixed in the mixing ratio of Table 1, and then kneaded in a heat-melted state with a three-roll mill, and then cooled to normal temperature, and then pulverized with a hammer mill as equipped with a screen of the diameter of 1 mm, thus obtaining a micro-powdery stain composition for an unsaturated polyester resin 10 (white).

TABLE 1

| | Titanium oxide | Carbon black | Red iron oxide | Titanium yellow | Cobalt blue | (1) Low molecular polystyrene | (2) Low molecular acrylstyrene | (3) Polystyrene | (4) Unsaturated polyester resin | (5) Low molecular polyethylene wax | Plasticizer (dibutyl) phthalate) | Pulverizing particle size |
|---|---|---|---|---|---|---|---|---|---|---|---|---|
| Example 1 (micro-powdery stain 1 (white)) | 70 | — | — | — | — | 30 | — | — | — | — | — | 60~350 |
| Example 2 (micro-powdery stain 2 (black)) | — | 20 | — | — | — | — | 80 | — | — | — | — | 50~350 |
| Example 3 (micro-powdery stain 3 (red)) | — | — | 65 | — | — | — | 35 | — | — | — | — | 60~350 |
| Example 4 (micro-powdery stain 4 (yellow)) | — | — | — | 60 | — | 40 | — | — | — | — | — | 50~350 |
| Example 5 (micro-powdery stain 5 (blue)) | — | — | — | — | 50 | — | — | 40 | — | — | 10 | 75~370 |
| Example 6 (micro-powdery stain 6 (toned color)) | 50 | 1 | 1 | 8 | — | 40 | — | — | — | — | — | 80~360 |
| Example 7 (micro-powdery stain 7 (toned color)) | 50 | 20 | — | — | — | 30 | — | — | — | — | — | 860~1250 |
| Comparative Example 1 (pasty stain 8 (yellow)) | — | — | — | 50 | — | — | — | — | 50 | — | — | Pasty |

TABLE 1-continued

|  | Titanium oxide | Carbon black | Red iron oxide | Titanium yellow | Cobalt blue | (1) Low molecular poly-styrene | (2) Low molecular acryl-styrene | (3) Poly-styrene | (4) Un-saturated polyester resin | (5) Low molecular poly-ethylene wax | Plasticizer (dibutyl) phthalate) | Pul-verizing particle size |
|---|---|---|---|---|---|---|---|---|---|---|---|---|
| Comparative Example 2 (pasty stain 9 (toned color)) | 50 | 1 | 1 | 8 | — | — | — | — | 40 | — | — | Pasty |
| Comparative Example 3 (micro-powdery stain 10 (white)) | 70 | — | — | — | — | — | — | — | — | 30 | — | 100~350 |

(Unit: weight part(s))
The footnotes of Table 1 above are as follows:
(1) Low molecular polystyrene: number-average molecular weight 5,000
(2) Low molecular acrylstyrene: number-average molecular weight 40,000
(3) Polystyrene: Denka Styrol GP-1B (made by Denki Kagaku Kogyo Co., Ltd.)
(4) Unsaturated polyester resin: Epolac N-14B (made by Nippon Shokubai Co., Ltd.)
(5) Low molecular polyethylene wax: number-average molecular weight 5,000

<Production and evaluation of unsaturated polyester resin composition>

EXAMPLES 8~18

COMPARATIVE EXAMPLES 4~6

(1) Production of SMC sheet

A compound was prepared by mixing an unsaturated polyester resin, a low-shrinkage agent, calcium carbonate, zinc stearate and T.B.P. in the ratio as shown in Table 2. Next, the stains were added and mixed into 243.0 parts of the above compound in the ratio as shown in Tables 2 and 3, and then 1.0 part of magnesium oxide was further added and mixed, thus preparing pasty unsaturated polyester resin compositions. The resultant unsaturated polyester resin compositions were coated and spread on a polyethylene film, and thereon 85.0 parts of glass chop of 10 mm in length was spread and impregnated well with the compositions using a roller, and further thereon the unsaturated polyester resin compositions were coated and spread, and the resultant composites were extended into a sheet-shape and then wrapped with a cellophane and folded up and matured at 40° C. for about 10 hours, thus producing SMC sheets.

(2) Molding

The SMC sheets as produced in procedure (1) above was cut off so as to weigh about 250 g and mounted on a tray-type press-molding machine with the diameter of 228 mm as adjusted to the temperature of 135~145 ° C., and then the sheets were press-molded for about 5 minutes at a molding pressure of 200~210 kg/cm$^2$ (gage pressure), thus obtaining plates.

(3) Evaluation of color unevenness

The colors of the plates as obtained by the above SMC-press-molding using the respective stains as of just after their production and as of after their conservation for 6 months were measured at several positions on those plates with a spectrophotometer, Macbeth Color Eye CE-3000, thus evaluating the unevenness (ΔE) of measured values on the below standard.

ΔE≦0.2 . . . ⊚
0.2<ΔE≦0.4 . . . ○
0.4<ΔE<1.0 . . . Δ
1.0≦ΔE . . . x (4) Color stability Differences between colors of the plates as obtained by the above SMC-press-molding using the respective stains as of just after their production and as of after their conservation for 6 months were measured to evaluate the color stability.

TABLE 2

|  | Example 8 | Example 9 | Example 10 | Example 11 | Example 12 | Example 13 | Example 14 |
|---|---|---|---|---|---|---|---|
| Unsaturated polyester resin*$^1$ | 80.0 | 80.0 | 80.0 | 80.0 | 80.0 | 80.0 | 80.0 |
| Low-shrinkage agent*$^2$ | 20.0 | 20.0 | 20.0 | 20.0 | 20.0 | 20.0 | 20.0 |
| Calcium carbonate | 140.0 | 140.0 | 140.0 | 140.0 | 140.0 | 140.0 | 140.0 |
| Zinc stearate | 2.0 | 2.0 | 2.0 | 2.0 | 2.0 | 2.0 | 2.0 |
| T.B.P.*$^3$ | 1.0 | 1.0 | 1.0 | 1.0 | 1.0 | 1.0 | 1.0 |
| Micro-powdery stain 1 (white) | 8.51 | — | — | — | — | — | — |
| Micro-powdery stain 2 (black) | — | 8.51 | — | — | — | — | — |
| Micro-powdery stain 3 (red) | — | — | 8.51 | — | — | — | — |
| Micro-powdery stain 4 (yellow) | — | — | — | 8.51 | — | — | — |
| Micro-powdery stain 5 (blue) | — | — | — | — | 8.51 | — | — |

TABLE 2-continued

|  | Example 8 | Example 9 | Example 10 | Example 11 | Example 12 | Example 13 | Example 14 |
|---|---|---|---|---|---|---|---|
| Micro-powdery stain 6 (toned color) | — | — | — | — | — | 8.51 | — |
| Micro-powdery stain 7 (toned color) | — | — | — | — | — | — | 8.51 |
| Pasty stain 8 (yellow) | — | — | — | — | — | — | — |
| Pasty stain 9 (toned color) | — | — | — | — | — | — | — |
| Micro-powdery stain 10 (white) | — | — | — | — | — | — | — |
| Magnesium oxide | 1.0 | 1.0 | 1.0 | 1.0 | 1.0 | 1.0 | 1.0 |
| Glass Chop*4 | 85.0 | 85.0 | 85.0 | 85.0 | 85.0 | 85.0 | 85.0 |
| Dissolution time of stain | Mixing for 10 minutes | Mixing for 10 minutes | Mixing for 10 minutes | Mixing for 10 minutes | Mixing for 10 minutes | Mixing for 10 minutes | Mixing for 2 hours |
| Evaluation of color unevenness |  |  |  |  |  |  |  |
| Just after production | ⊚ | ⊚ | ⊚ | ⊚ | ⊚ | ⊚ | ⊚ |
| After conservation for for 6 months | ⊚ | ⊚ | ⊚ | ⊚ | ⊚ | ○ | ⊚ |
| Color stability | 0.1 | 0.1 | 0.1 | 0.1 | 0.2 | 0.3 | 0.2 |

(Unit: weight part(s))

TABLE 3

|  | Example 15 | Example 16 | Example 17 | Example 18 | Comparative Example 4 | Comparative Example 5 | Comparative Example 6 |
|---|---|---|---|---|---|---|---|
| Unsaturated polyester resin*1 | 80.0 | 80.0 | 80.0 | 80.0 | 80.0 | 80.0 | 80.0 |
| Low-shrinkage agent*2 | 20.0 | 20.0 | 20.0 | 20.0 | 20.0 | 20.0 | 20.0 |
| Calcium carbonate | 140.0 | 140.0 | 140.0 | 140.0 | 140.0 | 140.0 | 140.0 |
| Zinc stearate | 2.0 | 2.0 | 2.0 | 2.0 | 2.0 | 2.0 | 2.0 |
| T.B.P.*3 | 1.0 | 1.0 | 1.0 | 1.0 | 1.0 | 1.0 | 1.0 |
| Micro-powdery stain 1 (white) | 7.29 | 7.29 | 7.29 | 7.29 | — | — | — |
| Micro-powdery stain 2 (black) | 1.22 | — | — | — | — | — | — |
| Micro powdery stain 3 (red) | — | 1.22 | — | — | — | — | — |
| Micro-powdery stain 4 (yellow) | — | — | 1.22 | — | — | — | — |
| Micro-powdery stain 5 (blue) | — | — | — | 1.22 | — | — | — |
| Micro-powdery stain 6 (toned color) | — | — | — | — | — | — | — |
| Micro-powdery stain 7 (toned color) | — | — | — | — | — | — | — |
| Pasty stain 8 (yellow) | — | — | — | — | 8.51 | — | — |
| Pasty stain 9 (toned color) | — | — | — | — | — | 8.51 | — |
| Micro-powdery stain 10 (white) | — | — | — | — | — | — | 8.51 |
| Magnesium oxide | 1.0 | 1.0 | 1.0 | 1.0 | 1.0 | 1.0 | 1.0 |
| Glass chop*4 | 85.0 | 85.0 | 85.0 | 85.0 | 85.0 | 85.0 | 85.0 |
| Dissolution time of stain | Mixing for 10 minutes | Mixing for 10 minutes | Mixing for 10 minutes | Mixing for 10 minutes | Mixing for 10 minutes | Mixing for 10 minutes | Not soluble and not compatible |
| Evaluation of color unevenness |  |  |  |  |  |  |  |
| Just after production | ⊚ | ⊚ | ⊚ | ⊚ | ⊚ | ⊚ | X |
| After conservation for 6 months | ⊚ | ⊚ | ⊚ | ⊚ | X | X | X |
| Color stability | 0.2 | 0.1 | 0.1 | 0.2 | 3.0 | 9.6 | — |

(Unit: weight part(s))
The footnotes of Tables 2 and 3 above are as follows:
*1Unsaturated polyester resin: Epolac N-21B (made by Nippon Shokubai Co., Ltd.)
*2Low-shrinkage agent: Epolac AT-100 (made by Nippon Shokubai Co., Ltd.)
*3T.B.P. (tert-butyl peroxybenzoate): Perbutyl Z (made by NOF CORPORATION)
*4Glass chop: Chop Strand CS-13PB 549CA: (made by Nitto Boseki Co., Ltd.)

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A micro-powdery stain composition for an unsaturated polyester resin, comprising:
   a) either or both of a pigment and an oil-soluble dye; and
   b) a resin, wherein said resin as included in the composition is at least one resin selected from the group consisting of polystyrene having a number-average molecular weight from 60,000 to 200,000, low molecular polystyrene having a number-average molecular weight from 1000 to 10,000, low molecular acrylstyrene having a number-average molecular weight from 1000 to 10,000 and low molecular acryl having a number-average molecular weight from 1000 to 10,000.

2. (Amended) A micro-powdery stain composition according to claim 1, wherein the composition comprises micro-powdery stain particles having an average particle diameter of 900 microns or less, with the micro-powdery stain particles including the resin and further including either or both of the pigment and the oil-soluble dye.

3. An unsaturated polyester resin composition, comprising:
   a) an unsaturated polyester resin;
   b) either or both of a pigment and an oil-soluble dye; and
   c) wherein the composition further comprises at least one resin selected from the group consisting of low molecular polystyrene having a number-average molecular weight from 1000 to 10,000, low molecular acrylstyrene having a number-average molecular weight from 1000 to 10,000 and low molecular acryl having a number-average molecular weight from 1000 to 10,000.

4. A production process for an unsaturated polyester resin composition comprising the steps of:
   a) providing an unsaturated polyester resin;
   b) providing a micro-powdery stain composition wherein the micro-powdery stain composition comprises:
      i) either or both of a pigment and an oil-soluble dye; and
      ii) at least one resin selected from the group consisting of polystyrene having a number-average molecular weight from 60,000 to 200,000 low molecular polystyrene having a number-average molecular weight from 1000 to 10,000, low molecular acrylstyrene having a number-average molecular weight from 1000 to 10,000 and low molecular acryl having a number-average molecular weight from 1000 to 10,000; and
   c) mixing the unsaturated polyester resin with the micro-powdery stain composition to obtain the unsaturated polyester resin composition.

5. A micro-powdery stain composition according to claim 1, wherein an amount of said resin is in a range of 80 to 500 weight parts per 100 weight parts of either or both of the pigment and the oil-soluble dye.

6. An unsaturated polyester resin composition according to claim 3, wherein an amount of said resin is in a range of 80 to 500 weight parts per 100 weight parts of either or both of the pigment and the oil-soluble dye and wherein a total amount of 1) said resin and 2) either or both of the pigment and the oil-soluble dye is in a range of 25 weight parts or below per 100 weight parts of the unsaturated polyester resin.

7. A production process for an unsaturated polyester resin composition according to claim 4, wherein an amount of said resin is in a range of 80 to 500 weight parts per 100 weight parts of either or both of the pigment and the oil-soluble dye and wherein an amount of said micro-powdery stain composition is in a range of 25 weight parts or below per 100 weight parts of the unsaturated polyester resin.

8. The micro-powdery stain composition according to claim 1, wherein the composition comprises micro-powdery stain particles having an average particle diameter of 900 microns or less, with the micro-powdery stain particles including the resin and further including either or both of the pigment and the oil-soluble dye.

9. An unsaturated polyester resin composition according to claim 3, wherein the composition comprises micro-powdery stain particles having an average particle diameter of 900 microns or less, with the micro-powdery stain particles including the resin and further including either or both of the pigment and the oil-soluble dye.

10. A production process for an unsaturated polyester resin composition according to claim 4, wherein the composition comprises micro-powdery stain particles having an average particle diameter of 900 microns or less, with the micro-powdery stain particles including the resin and further including either or both of the pigment and the oil-soluble dye.

11. A micro-powdery stain composition for an unsaturated polyester resin, comprising:
   a) a coloring agent;
   b) a resin, wherein the resin is soluble in styrene, wherein the resin is soluble in unsaturated polyester resin, wherein the resin is still further a low-shrinkage agent for unsaturated polyester resin, and wherein the resin is in a form of micro-powdery stain particles;
   c) wherein an amount of said resin is in a range of 80 to 500 weight parts per 100 weight parts of the coloring agent;
   d) wherein the micro-powdery stain particles have an average particle diameter of 900 microns or less; and
   e) wherein the micro-powdery stain particles include the coloring agent to obtain the micro-powdery stain composition to be mixed into the unsaturated polyester resin.

12. A micro-powdery stain composition according to claim 11, wherein the average particle diameter of the micro-powdery stain particles is 400 microns or less.

13. A micro-powdery stain composition according to claim 11, wherein said resin as included in the composition is at least one resin selected from the group consisting of polystyrene, acrylstyrene and acryl.

14. An unsaturated polyester resin composition, comprising:
   a) an unsaturated polyester resin;
   b) a coloring agent;
   c) at least one further resin, wherein said further resin is soluble in styrene, wherein said further resin is soluble in unsaturated polyester resin, wherein said further resin is still further a low-shrinkage agent for unsaturated polyester resin, and wherein said further resin is in a form of micro-powdery stain particles;
   d) wherein an amount of said further resin is in a range of 80 to 500 weight parts per 100 weight parts of the coloring agent;

e) wherein the micro-powdery stain particles have an average particle diameter of 900 microns or less;

f) wherein the micro-powdery stain particles include the coloring agent; and g) wherein an amount of the micro-powdery stain particles is in a range of 25 weight parts or below per 100 weight parts of the unsaturated polyester resin.

15. An unsaturated polyester resin composition according to claim 14, wherein the average particle diameter of the micro-powdery stain particles is 400 microns or less.

16. An unsaturated polyester resin composition according to claim 14, wherein said further resin as included in the composition is at least one resin selected from the group consisting of polystyrene, acrylstyrene and acryl.

17. A production process for an unsaturated polyester resin composition comprising the steps of:

a) providing an unsaturated polyester resin;

b) providing a micro-powdery stain composition, with the micro-powdery stain composition comprising:

i) a coloring agent;

ii) at least one further resin, wherein said further resin is soluble in styrene, wherein said further resin is soluble in unsaturated polyester resin, wherein said further resin is still further a low-shrinkage agent for unsaturated polyester resin, and wherein said further resin is in a form of micro-powdery stain particles;

iii) wherein an amount of said further resin is in a range of 80 to 500 weight parts per 100 weight parts of the coloring agent;

iv) wherein the micro-powdery stain particles have an average particle diameter of 900 microns or less;

v) wherein the micro-powdery stain particles include the coloring agent; and vi) wherein an amount of the micro-powdery stain particles is in a range of 25 weight parts or below per 100 weight parts of the unsaturated polyester resin; and c) mixing the unsaturated polyester resin with the micro-powdery stain composition to obtain the unsaturated polyester resin composition.

18. A production process for an unsaturated polyester resin composition according to claim 17, wherein the average particle diameter of the micro-powdery stain particles is 400 microns or less.

19. A production process for an unsaturated polyester resin composition according to claim 17, wherein said further resin as included in the composition is at least one resin selected from the group consisting of polystyrene, acryistyrene and acryl.

* * * * *